United States Patent [19]

Silvestri et al.

[11] 3,901,043

[45] Aug. 26, 1975

[54] APPARATUS FOR LAYING A PIPELINE ON THE SEA-BOTTOM FROM A FLOATING VESSEL

[75] Inventors: Antonio Silvestri, San Donato Milanese; Guglielmo Gargatagli, Milan, both of Italy

[73] Assignee: Saipem S.p.A., Milan, Italy

[22] Filed: Oct. 31, 1973

[21] Appl. No.: 411,417

[30] Foreign Application Priority Data
Nov. 21, 1972 Italy.................................. 31897/72

[52] U.S. Cl..................... 61/72.3; 16/179; 214/1 P; 214/1 BB
[51] Int. Cl.².... B63B 35/04; F16L 1/00; B25J 3/00
[58] Field of Search ............. 61/72.3, 72.1; 16/179, 16/166; 214/1 P, 1 BB; 14/27

[56] References Cited
UNITED STATES PATENTS

| | | | |
|---|---|---|---|
| 3,462,963 | 8/1969 | Moore | 61/72.4 |
| 3,507,126 | 4/1970 | Rochelle et al. | 61/723 |
| 3,517,519 | 6/1970 | Kolb et al. | 61/72.3 |
| 3,739,590 | 6/1973 | Whitfield | 61/72.3 |
| 3,775,987 | 12/1973 | Rochelle et al. | 61/72.3 |

FOREIGN PATENTS OR APPLICATIONS
405,642   8/1943   Italy......................................... 14/27

Primary Examiner—Jacob Shapiro
Attorney, Agent, or Firm—Ralph M. Watson, Esq.

[57] ABSTRACT

Apparatus for laying a pipeline of large diameter on a deep sea-bed without kinking or excessive bending includes a floating vessel having a discharge track sloping downwardly toward the stern to support the outer end of a pipeline for sliding movement and mechanism for imparting tension to a pipeline is mounted on the discharge track. A stinger, adapted to slidingly support a pipeline as it is being laid, is pivotably connected to the discharge end of the track and is formed from articulated ramp segments, each buoyantly supported independently of the others so that its depth in the water may be regulated, whereby the stinger may be caused to extend downwardly from the stern of the vessel along a predetermined slope.

5 Claims, 8 Drawing Figures

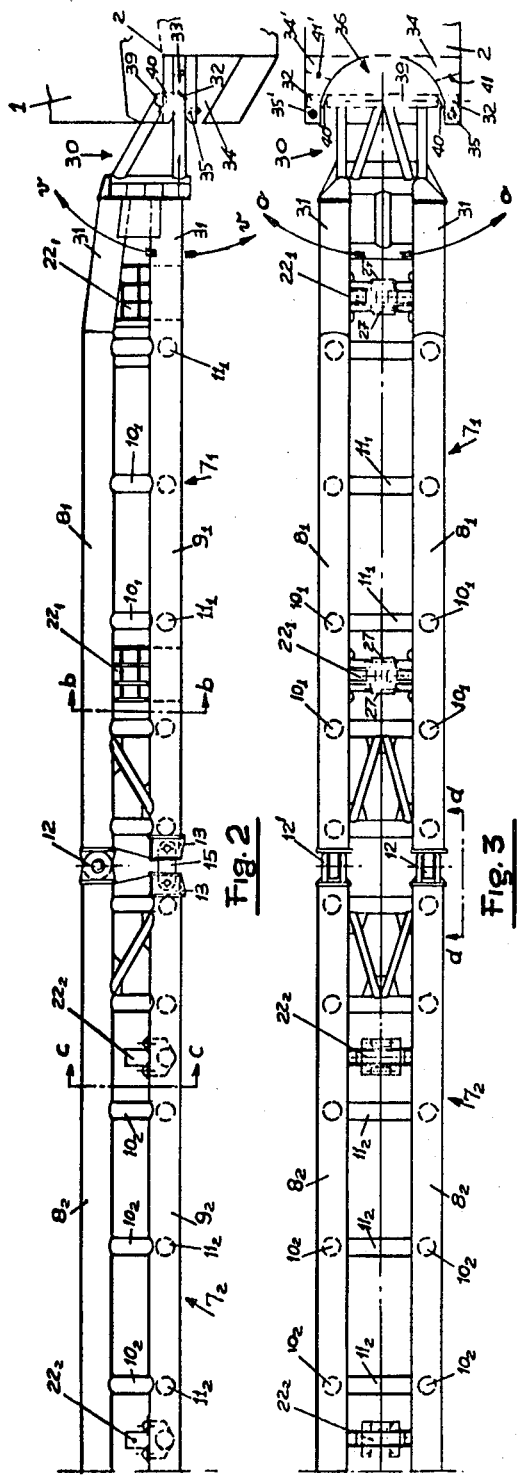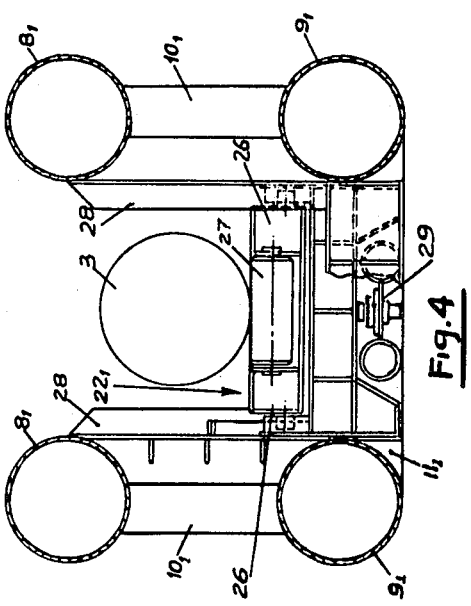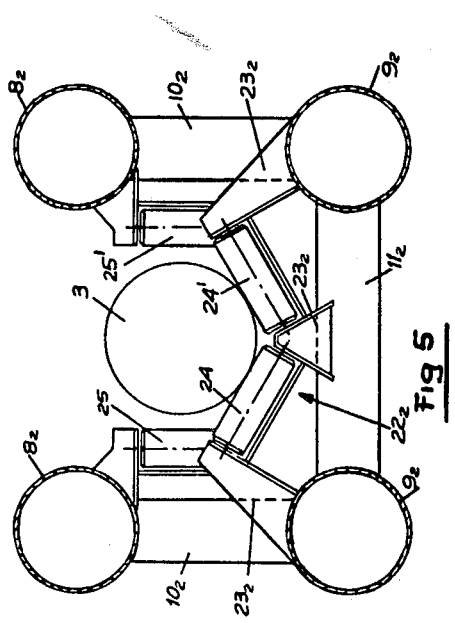

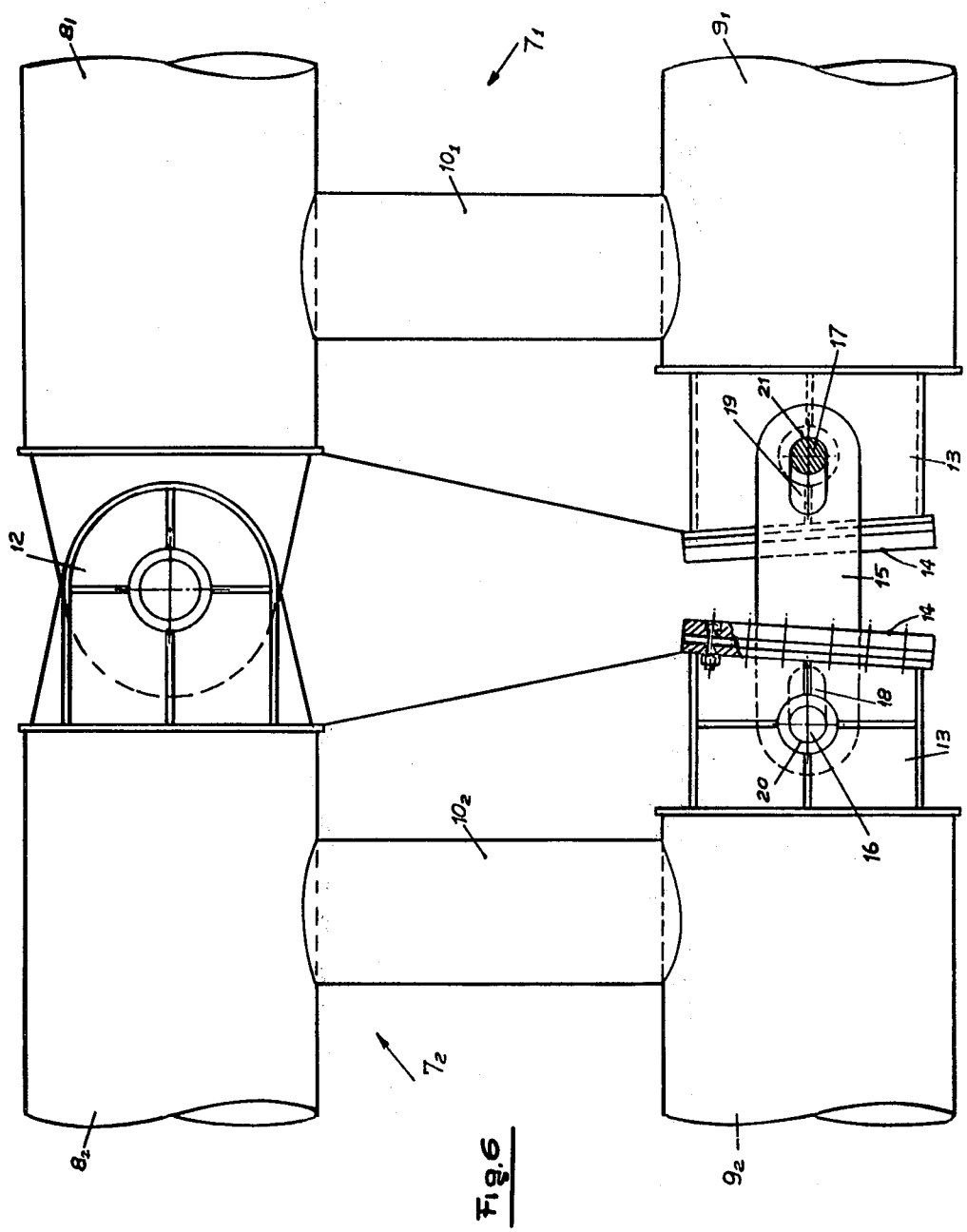

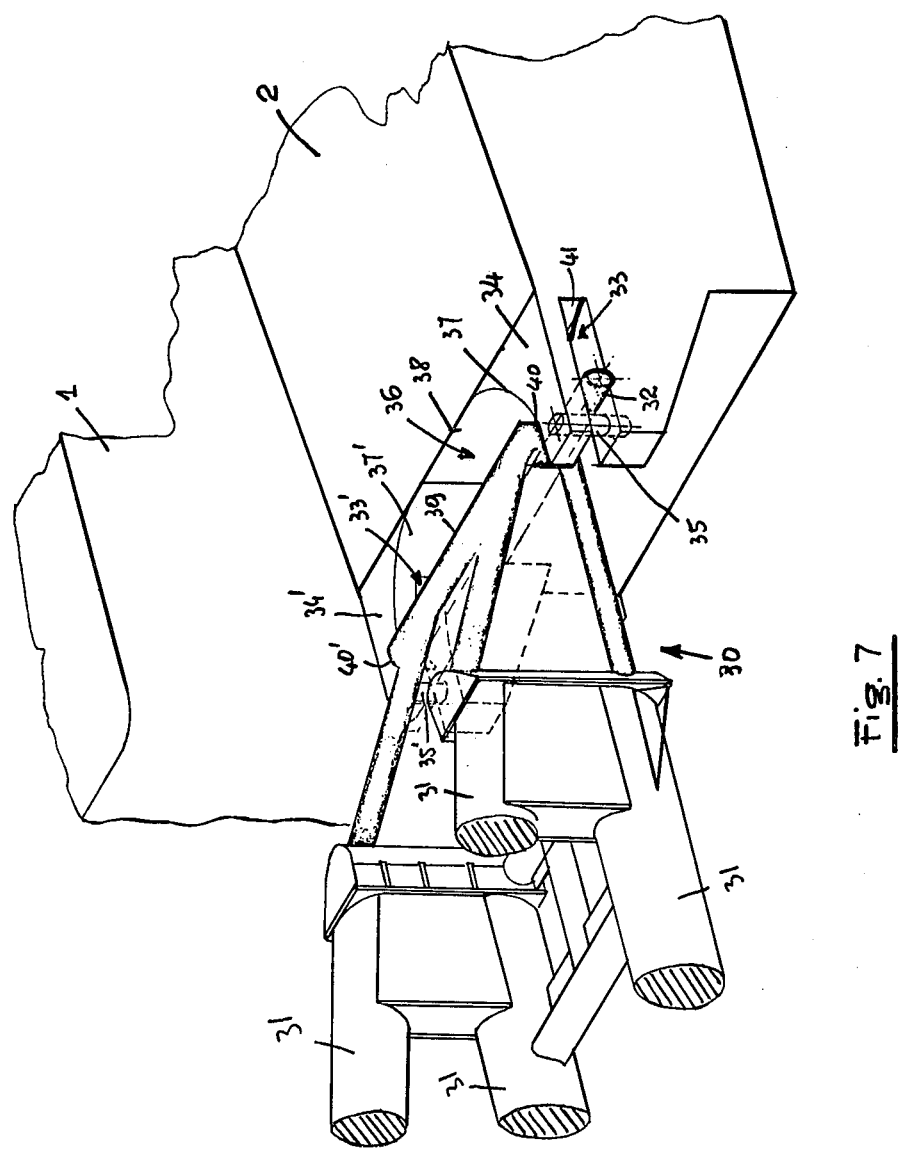

APPARATUS FOR LAYING A PIPELINE ON THE SEA-BOTTOM FROM A FLOATING VESSEL

The present invention relates to an improved apparatus for laying a pipeline on the sea-bottom from a floating vessel without causing pipe kinking or excessive bending in the pipeline. This invention is particularly suited for laying pipeline of large size in deep waters.

The increased development of offshore gas and oil wells has increased the demand for more and more effective pipe-laying apparatus to connect underwater wells and to bring products to shore. For this purpose use is made generally of a floating vessel on the bow of which pipe lengths are assembled and welded. The floating vessel is then moved forwardly so that the assembled pipeline slide is on rollers toward the vessel stern and is lowered to the sea-bottom. The pipe employed is generally made of steel with a concrete coating which is capable of withstanding some bending. However, any bending of the assembled pipeline must be maintained within pre-determined limits to avoid kinking or permanent deformations of the pipeline which would render it ineffective. For this purpose use is made of a tensioning mechanism continuously imparting an effective tensioning force to the pipeline, and of a slidably supporting pipeline ramp or so-called "stinger" which is pivotally connected to the vessel stern and serves to slidably support the pipeline leaving the vessel downwardly toward the sea-bottom according to a predetermined curvature whose radius depends on the water depth.

Various methods and apparatus for laying a pipeline on the sea-bottom are already known by the prior art. However, all these known methods and apparatus have engendered operating difficulties, have proven unsafe because they tend to cause pipe damage during the pipeline laying operation, or are so complicated or cumbersome as not to be commercially acceptable.

It is an object of the present invention to eliminate the above-said drawbacks by providing a practical and simple apparatus which assures easy and flawless laying of pipe without causing pipe kinking or, in the case of a laying in deep waters, excessive bending in the pipeline.

According to the present invention an articulated and self-settling "stinger" is provided having a plurality (5 or 6) of ramp segments interconnected in end-to-end pivotal relationship at their upper ends so as to allow for pivoting between ramp segments in a vertical plane.

Each ramp segment comprises four longitudinal, tubular pontoons displaced at the corners of a square which are connected on three sides by a stiff frame structure in the middle of which the pipeline to be laid slides and is guided by two supporting mechanisms having sliding rollers arranged in the form of a "V". While the upper pontoons of each ramp segment are pivotally joined to the corresponding upper pontoons of the adjacent segments, the lower pontoons include at their ends stop means limiting the downward rotation of the ramp segments. The upward rotation of the ramp segments, on the other hand, prevented by stop plates having egg-shaped holes wherein the pins of two adjacent ramp segments extend. The size and position of the egg-shaped holes in the stop plates is such that the pins come into contact with the hole walls located near the outer ends of the plates when the ramp segments are mutually lined up, while the pins come into contact with the hole walls located near the inner ends of the plates only when the said stop means limiting the downward rotation of two adjacent ramp segments lean against each other.

In the said tubular pontoons of the ramp segments there are water-tight compartments for remotely varying the buoyancy of each ramp segment by introducing water and/or air into the compartments to incline each ramp segment relative to the adjacent ramp segment so that the stinger is adjusted to a curvature in the form of a broken line which approximates the desired curvature for the pipeline to be laid.

According to a distinctive feature of the method and apparatus of the present invention, the first ramp segment is pivotally joined to the vessel by means of two slidably supporting pipeline mechanisms having sliding rollers with horizontally pivoted axes, which are adjustable as to height so that, according to the present invention, the curvature of the pipeline portion slidably supported on the stinger can be readily adapted to the curvature of the pipeline portion slidably supported on the pipeline discharging track of the vessel in accordance with of the last slidably supporting pipeline mechanism located on the stern end of the vessel.

According to the method and apparatus of the present invention, the first ramp segment is attached to the vessel in such a way to enable not only a pivoting in a vertical plane but also a limited pivoting in a horizontal plane of the stinger relative to the vessel for obviating eventual, side see-currents or an eventual deviation of the vessel from its course: In turn the stinger includes ramp segments which are simply pivoted together to make the stinger self-settling in the most propitious positions of equilibrium relative to external variable, such as the tensioning force exerted on the pipeline, the water depth where the pipeline is laid, the action of the wave or of the rolling motion of the vessel, etc.

According to another distinctive feature of the invention, the coupling of the stinger to the vessel is obtained by means of a mechanism which facilitates a sure and quick attachment of the stinger to the vessel. The mechanism comprises a tubular bridge-shaped structure which is welded to the front side of the first ramp segment to constitute a prolongation of said segment. The structure includes at its lower front part a horizontal coupling shaft which extends from both sides of the structure, and enters two long horizontal forks at the rear edge of the pipeline discharging track of the vessel where it is supported by the lower surfaces of said forks. The shaft of the structure is prevented from coming out from the forks by two clamping pins which vertically slide into vertical holes near the fork edge and which act as a stop means for said coupling shaft. In this way the tubular bridge-shaped structure and the first ramp segment and consequently the whole stinger can rotate in a vertical plane, the axis of the coupling shaft acting as an axis of rotation and the two clamping pins and the two fork slits as support means. Moreover, between the two forks at the stern of the vessel there is a vertical recess having a curvilinear shape (two archs of a circle connected to a rectilinear section), wherein the front part of the said tubular bridge-shaped structure extends so that the vertical side shoulders of said structure are guided by the vertical wall of the said recess and follow the curved shape of said recess. In this way, the tubular bridge-shaped structure, and hence the stinger, also can rotate in a horizontal plane, because the coupling shaft of the tubular structure can slide along the whole depth of the slit in the forks and because vertical shoulders of the bridge-shaped structure must follow the curved shape of the recess, to thereby change the sliding of the shaft into a horizontal rotation around one of the two clamping pins. The horizontal rotation of the stinger is limited to about 15° because the coupling shaft is stopped in its movement by a vertical and inward inclined wall delimiting each rear bottom of the fork slit.

According to the present invention use is also made of a particular tracked tensioning mechanism able to continuously apply a tensioning force to a pipeline even of a large size and to adapt itself to the curved profile of the pipeline portion slidably supported on the discharging track of the vessel. This tensioning mechanism is described in our Italian Pat. specification No. 899,384.

Finally, since the welding of a new pipe to the already assembled pipeline can be made only if said pipe is perfectly lined up with the said pipeline, according to the present invention use is made of a pipe coupling and lifting mechanism set up on the bow of the vessel, near the welding stations which even can handle large size pipe whose handling has heretofore been difficult.

According to a distinctive feature of the invention, said pipe coupling and lifting mechanism comprises two conveyor belts arranged in parallel on the vessel and at right angles to the longitudinal axis of the discharging track of the vessel. The conveyor belts serve to bring the pipe to be welded from the storing station to the lining-up station where the pipe can be taken by a pair of elevators able to rotate the pipe around its axis for offsetting the longitudinal welding of the pipe relative to the pipeline, or by a pair of elevators able to slope and to longitudinally advance pipe for approaching said pipe to the pipeline to which it is to be welded with a proper slope. Each elevator can be independently and remotely controlled in a pneumatic or electric way and includes, according to the invention, a vertically movable frame member carrying a pair of sliding rollers.

The pairs of elevators are furthermore carried by two trolleys movable on rails orthogonally relative to the said longitudinal axis of the discharging track so that the elevators can be mutually moved sidewise to obtain the lining-up of the pipe to the pipeline.

The rotatory motion is then given to the pipe by a remotely operable driving roller having its axis oriented parallel to the longitudinal axis of the discharging track, said driving roller being carried by a vertically movable and remotely controlled frame member, while the advancing motion of the pipe is obtained by means of a second remotely operable driving roller having its axis oriented orthogonally relative to the longitudinal axis of the discharging track, said second driving roller being carried by a second vertically movable frame member similar to the first one, the said frame members of the driving rollers being located in the middle zone between the pairs of elevators. In this way a single operator is able to carry out from one station all the operations necessary to a perfect lining-up of the pipe to the pipeline, before welding.

The invention will now be illustrated in the accompanying drawings, which are merely exemplary and non-limiting, in that the adoption of constructional techniques or equivalent members different from those suggested herein lies within the scope of the present invention. In said drawings:

FIG. 2 shows schematically an enlarged longitudinal view of the stinger part defined by section line a—a of FIG. 1 and comprises the first ramp segment and a portion of the second ramp segment, the stinger being viewed as a rectilinear stinger;

FIG. 3 is a schematic, plan view of the stinger part of FIG. 2;

FIG. 4 shows schematically an enlarged front view of the stinger as viewed along section line b—b of FIG. 2, illustrating one of the slidably supporting pipeline mechanisms of the invention which is adjustable relative to the height of the first ramp segment;

FIG. 5 shows schematically an enlarged front view of the stinger as viewed along section line c—c of FIG. 2;

FIG. 6 is an enlarged, schematic and fragmentary elevational view of the hinged connection, as well as of the stop means and relevant stop plate of two adjacent ramp segments in accordance with the invention, as seen along the view direction d-d of FIG. 3;

FIG. 7 is an enlarged, schematic and fragmentary perspective view of the connecting mechanism pivotally joining the first ramp segment to the floating vessel in accordance with the invention;

Figure 1:
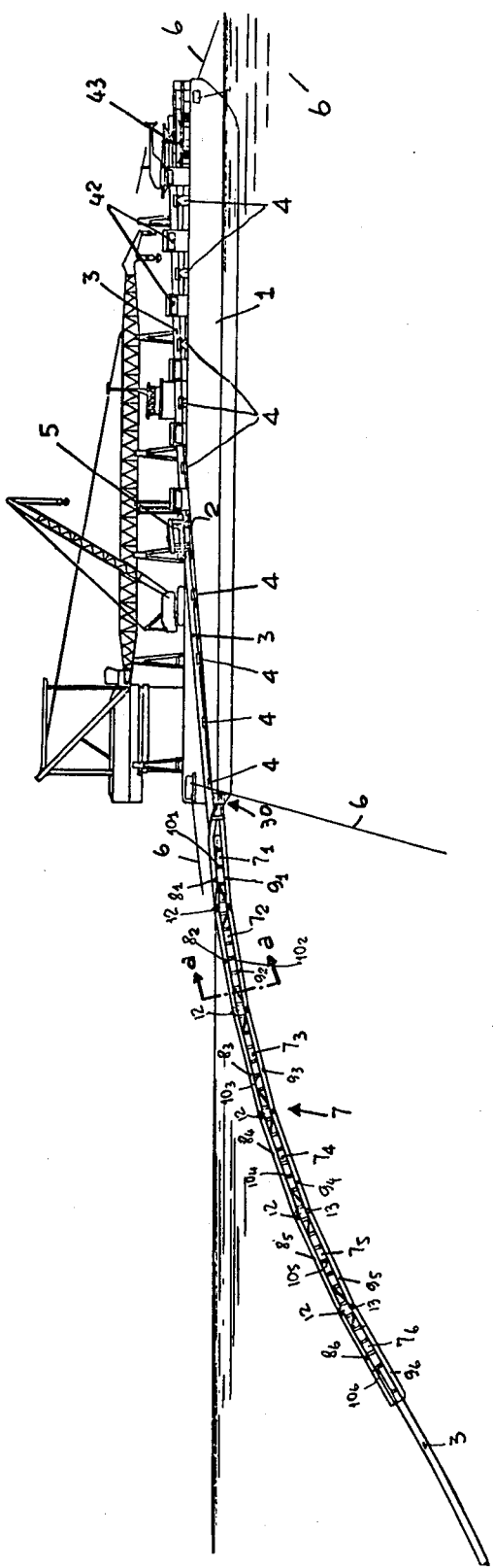
FIG. 1 shows schematically a side view of the entire apparatus of the invention employed in laying pipeline on the sea-bottom from a floating vessel.

Referring to drawings, there is shown a floating vessel 1 employed according to the present invention for laying a pipeline on the sea-bottom.

On vessel 1 there is a pipeline discharging track 2 sloping down from the bow to the stern of the vessel with the pipeline 3 to be laid supported on said track 2 by supporting mechanisms 4 having sliding rollers arranged in the form of a "V". Said mechanisms are independently adjustable as to the height by means of jacks and the like so that it is possible to give a predetermined curvature to the pipeline portion located on the pipeline discharging track 2 of the vessel.

A particular tensioning mechanism 5 able to lay pipeline of a large size in deep waters is mounted on the discharging track 2 of the vessel 1. As described in our Italian Pat. specification No. 899,384, mechanism 5 prevents pipeline 3 from freely sliding toward the sea-bottom by imparting to said pipeline a tensioning force by means of two opposed caterpillars which adapt themselves to the curvature of the pipeline portion located on the discharging track of the vessel and which clamp the pipeline therebetween. The laying of the pipeline on the sea-bottom therefore occurs only when vessel 1 is moved forwardly, by means of winchs acting on the anchoring chains 6 which extend outwardly from each corner of the vessel and which serve to stabilize the vessel.

The outer discharging track 2 of the floating vessel pipeline 3 is supported and guided by a ramp or "stinger" 7 which is pivotally joined to the stern of vessel 1 so as to constitute a continuation of the pipeline discharging track 2. The stinger 7 also serves to give to pipeline 3 a predetermined curvature whose radius is always greater than the one corresponding to the yield point of the pipeline. According to the invention the stinger is formed by a plurality of ramp segments $7i$, where $i = 1, 2, 3, ...$ (six ramp segments in FIG. 1), each one of which comprises a single stiff frame structure formed by two longitudinal and tubular upper pontoons $8i$ and two longitudinal and tubular lower pontoons $9i$ connected by regularly spaced vertical and tubular frame elements $10i$ and by correspondingly spaced horizontal and tubular frame elements $11i$ so that the cross-section of the whole frame structure presents the form of a "U" (see specifically FIGS. 4 and 5).

The ramp segments $7i$ are pivotally connected each other at the ends of their pontoons $8i$ by means of known hinges 12 and 12' so that they can freely rotate in a vertical plane. This makes the stinger perfectly self-settling in the most propitious positions of equilibrium relative to external variable parameters, such as the tensioning force exerted by the tensioning mechanism on the pipeline, the water depth where the pipeline is laid, the action of the wave motion or of the rolling motion of the vessel, etc. The downward rotation in the vertical plane of the ramp segments $7i$ is limited by stop means 13 which axially protrude from the ends of the lower tubular pontoons $9i$ of the ramp segments (see specifically FIG. 6), and which present downwardly sloped active surfaces 14. The upward rotation in the vertical plane of the ramp segments $7i$ is prevented by stop plates 15 which enter suitable slits in the middle zone of the active surfaces 14 of two contiguous stop means 13. The stop plates are connected to the two contiguous stop means by two pins 16 and 17 which are fixed to the stop means and which enter the egg-shaped holes 18 and 19 at the ends of stop plates 15. In this way, while the downward rotation of two adjacent ramp segments is allowed because the two pins 16 and 17 can slide in the egg-shaped holes 17 and 18 of the stop plates 15 until the active surfaces 14 of the stop means 13 of the ramp segmets touch each other, upward rotation is completely prevented because the pins 16 and 17 press against the outer walls 20 and 21 of the egg-shaped holes 18 and 19 of the stop plates 15. In tubular pontoons $8i$ and $9i$ (where $i = 1, 2, 3 ...$) of the ramp segments there are watertight compartments wherein water and/or air can be introduced by means of a remote-control on the vessel. With this control the buoyancy of each ramp segment can be remotely varied according to a predetermined design and downward slope in such a way that each ramp segment can be adjusted with respect to each adjacent ramp segment so that the stinger can have a curvature in form of a broken line which approximates the desired curvature for the pipeline to be laid on the sea-bottom.

The pipeline to be laid 3 follows the curvature of the stinger and is slidably guided into the U-shaped cross-section of the stinger and above the said horizontal, tubular elements $11i$ by means of supporting mechanisms $22i$.

Each ramp segment $7i$, except the first ramp segment, includes a pair of supporting mechanisms $22i$ each one of which has a stiff frame structure $23i$ welded to the frame structure of the ramp segment which pivotally support two sliding rollers 24 and 24' arranged in the form of a "V" (see FIG. 5). Another two pairs of sliding rollers 25 and 25' are also included in each ramp segment. These said rollers 25 and 25' are vertically located on the sides of the frame structure of the ramp segment to facilitate the extending of pipeline 3 into the U-shaped cross-section of the frame structure of each ramp segment.

The pair of supporting mechanisms $22_1$ of the first ramp segment $7_1$, on the other hand each include a frame structure 26 which pivotally support two sliding rollers 27 that have horizontally pivoted axes. This frame structure is movable in a vertical direction along the slide guides 28 (see specifically FIG. 4) so that its height can be adjusted by remote pneumatic means on the vessel or by a manually operated in place handwheel acting on the jack 29. The use in the first ramp segment $7_1$ of slidably supporting pipeline mechanisms $22_1$ adjustable as to the height serves, according to the invention, to adapt the curvature of the pipeline portion supported by the stinger to the curvature of the pipeline portion located on the pipeline discharging track 2 of vessel 1.

The first ramp segment $7_1$ ends at its front side, i.e. at its end opposed to the one pivotally connected to second, adjacent ramp segment $7_2$, pivotally attached to vessel 1 by means of, a tubular bridge-shaped structure 30 which is welded to pontoons $8_1$ and $9_1$ of said ramp segment through four struts 31 in such a way that it is a prolongation of said ramp segment relative to its longitudinal axis. The tubular bridge-shaped structure (see FIGS. 2, 3 and specifically FIG. 7 also) includes at its free and lower front part a horizontal coupling shaft 32 which extends from both the sides of the structure and, enters the long slits 33 and 33' of two horizontal forks 34 and 34' on the sides of the stern end of the pipeline discharging track 2 of vessel 1. The shaft 32 is supported by the horizontal lower surface of the said slits and is prevented from coming out from the forks by two clamping pins 35 and 35' which by means of winches, vertical slide the pins 35 and 35' into vertical holes near the edge of the forks 34 and 34'. In this way the tubular bridge-shaped structure 30 and hence the first ramp segment $7_1$ and consequently the whole stinger can rotate in a vertical plane according to the arrows v—v (see FIG. 2). In doing so, the axis of the coupling shaft 32 acts as an axis of rotation and the two clamping pins 35 and 35' and the slits 33 and 33' of the two forks 34 and 34' act as support means. On the other hand, between the two side forks 34 and 34' of the pipeline discharging track 2 there is a vertical recess 36 having a curvilinear shape (two archs of a circle connected to a rectilinear section) into which the tubular and upper front part 39 of the said tubular bridge-shaped structure 30 extend. The vertical side shoulders 40 and 40' of said tubular part 39 are therefore guided by the vertical wall of said recess and hence follow the curved shape of said recess so that an allowed sliding of the coupling shaft 32 along the slits 33, 33' is changed, by virtue of the interaction between the said shoulders 40, 40' and the curvilinear recess 36, into a rotation of the said coupling shaft 22 and consequently of the stinger, in a horizontal plane according to the arrows o—o (see FIG. 3) around one of the two clamping pins 35, 35'. Such horizontal rotation is limited to about 15° because the coupling shaft 32 is stopped in its movement by one of the two vertical and inward inclined walls 41, 41' delimiting the rear bottom of the slits 33, 33' of the forks 34, 34'.

Summing up, the present invention provides for coupling of the stinger to the vessel in such a way so as to enable the stinger to rotate in a vertical plane and in a horizontal plane by means of an inexpensive mechanism which provides a sure and quick attachment consisting simply in introducing coupling shaft 32 into slits 33 and 33' of forks 34 and 34' and in lowering the clamping pins 35 and 35' in place.

Figure 8:
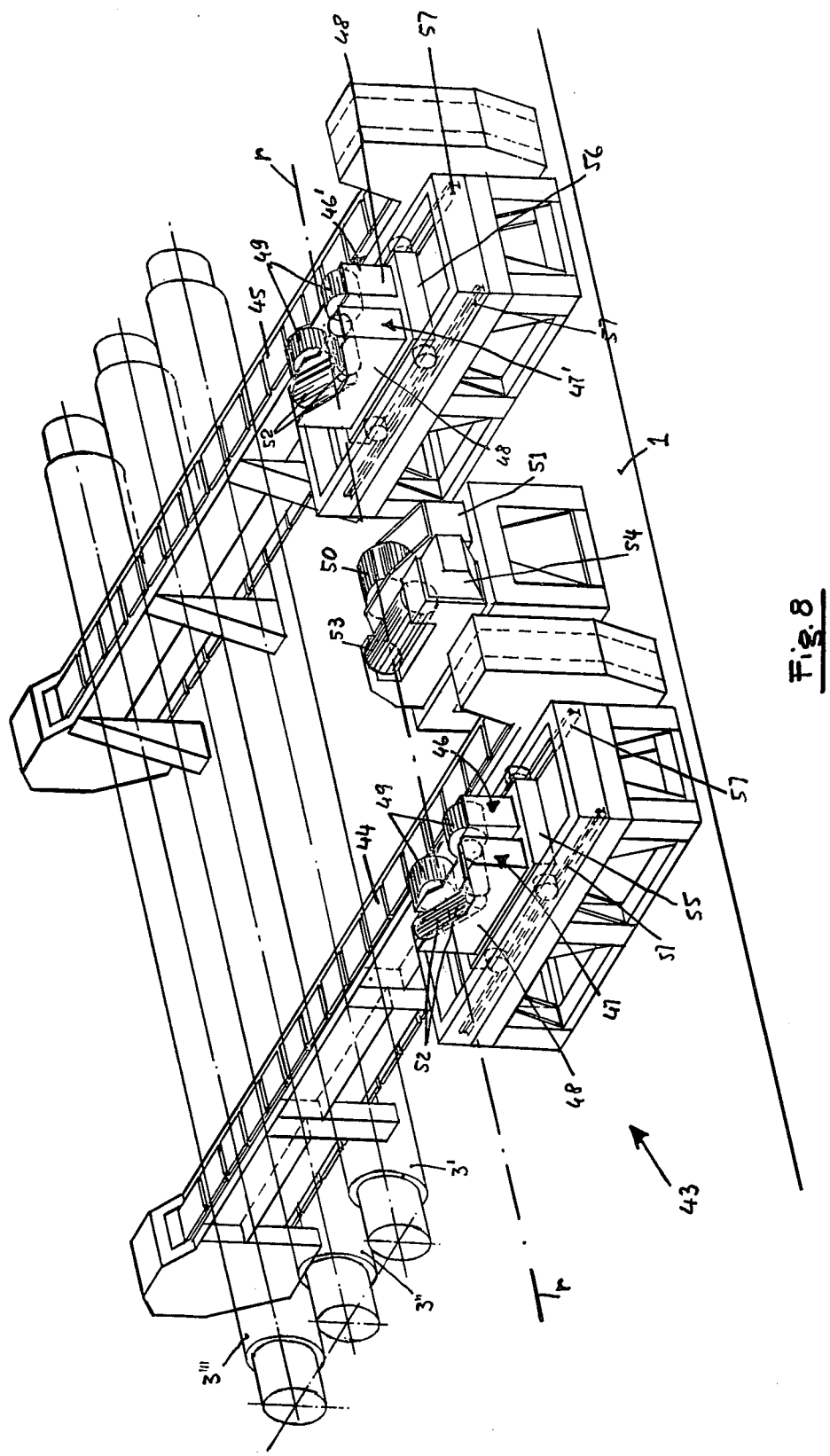
FIG. 8 shows schematically an enlarged, fragmentary, perspective view of the entire pipe coupling and lifting mechanism of the invention.

On the bow of vessel 1 and near the first of the welding stations 42 there is a mechanism 43 for coupling and lifting the pipes 3', 3'', 3''', ... to be welded to pipeline 3. The pipe coupling and lifting mechanism 43 comprises two conveyor belts 44 and 45 arranged parallel on the vessel 1 at right angles to the pipeline discharging track 2 (see FIG. 8 wherein the longitudinal axis of said discharging track 2 is shown by dotted line r—r). The belts 44 and 45 serve to bring the pipes to be welded 3', 3'', 3'''... from the storing station to the lining-up zone represented by dotted line r—r, where said pipes can be taken and lifted by the pair of elevators 46, 46' or by the pair of elevators 47, 47'. Each of the four elevators can be independently and remotely controlled in a pneumatic or electric way. Each elevator includes a vertically movable frame member 48 carrying a pair of sliding rollers, said vertical movement of the frame member 48 being provided by jacks and the like.

The sliding rollers 49 of elevators 46 and 46' present axes arranged in parallel to the dotted line r—r and serve to rotate the pipe to be welded around its axis for offsetting its longitudinal welding relative to the pipeline to be laid 3. Such rotation is given to the pipe by remotely operable driving roller 50 oriented as the said rollers and carried by a vertically movable and remotely controlled frame member 51 located in the middle zone between the said pairs of elevators. The sliding rollers 52 of the elevators 47 and 47', on the other hand, are arranged substantially in the form of a "V" in the orthogonal direction relative to the dotted line r—r and serve to longitudinally advance the pipe to be welded for approaching said pipe to pipeline 3. This advancing motion is given to the pipe by a remotely controlled driving roller 53 carried with its axis oriented orthogonally as to the dotted line r—r by a vertically movable and remotely controlled frame member 54.

The two pairs of elevators 46, 47 and 46', 47' are carried by two trolleys 55 and 56, which are movable on rails 57 orthogonally relative to the dotted line r—r, so that the elevators can be mutually moved in a sidewise direction to obtain the lining-up of the pipe to pipeline 3. Summing-up, the described pipe coupling and lifting mechanism 43 allows a single operator to remotely carry out from one station all the operations necessary, before welding, to a perfect lining-up of the tube to the pipeline to be laid.

The operations consist of bringing the pipe to be welded 3' along the axis r—r by means of conveyor belts 44 and 45; rotating said pipe around its axis for offsetting its longitudinal welding relative to the pipeline 3 by rollers 49 and their lifting elevators 46 and 46' and by driving roller 50; advancing the pipe for approaching it to the pipeline by rollers 52 and elevators 47 and 47' and driving roller 50; and finally in lining up the pipe according to the axis and slope of the pipeline 3 by sideways shifting of trolleys 55 and 56 and by lifting elevators 47 and 47' in appropriate directions.

What we claim is:

1. A floating vessel,
   a track on said vessel for discharging pipeline which slopes down from the bow to the stern of the vessel in an adjustable curvature and which includes a series of interconnected mechanisms having rollers thereon arranged in the form of a "V" for slidably supporting the pipeline,
   a tensioning mechanism on said discharging track for imparting a tension force to the pipeline,
   a mechanism on the bow of the vessel for coupling and lifting pipe to be welded to the pipeline on said discharging track, and
   an articulated, self-settling stinger pivotally connected to the stern of the vessel and said discharging track wherein said stinger includes a plurality of ramp segments each of which has two longitudinal and tubular upper pontoons and two longitudinal and tubular lower pontoons with water-tight compartments, said pontoons being interconnected and displaced at the corners of a square by regularly and longitudinally spaced tubular, vertical frame elements and by correspondingly spaced tubular, horizontal frame elements so that the cross-section of the structure of each ramp segment is in the form of a "U", and wherein
   said first ramp segment is pivotally joined to said discharge track and includes two slidably supporting pipeline mechanisms thereon which are adjustable as to height and which have sliding rollers with horizontally pivoted axes for receiving the pipeline from said discharging track,
   said other ramp segments include fixed supporting mechanisms thereon having sliding rollers arranged in the form of a "V,"
   said ramp segments, including the first said ramp segment, being pivotally connected to each other at the ends of adjacent upper pontoons by hinges secured thereto which allow rotation of said ramp segments in a vertical plane, stop means axially protruding from adjacent lower pontoons of said ramp segments which have active surfaces that are downwardly sloped relative to the vertical plane to limit downward vertical rotation of said ramps, and stop plates between said lower pontoons of said ramp segments having egg shaped holes in the ends thereof, each of which engages a pin fixed to said stop means to prevent upward vertical rotation of said ramps.

2. The apparatus according to claim 1 wherein the first ramp segment and hence the whole stinger is pivotally connected to the stern end of the pipeline discharging track of the vessel so as to rotate both in a vertical plane and in a horizontal plane,
   comprising, at the stern end of said discharging track, a pair of opposing rearwardly, extending horizontal forks which have slits therebetween, clamping pins in said forks adjacent the first segment of the stinger and extending across the slits between said forks, and a recess between said opposing forks defined by an inwardly directed vertical wall of curvilinear shape, and
   a tubular bridge shaped structure in alignment with the longitudinal axis of the discharging track which is welded at one end of the longitudinal pontoons of said first ramp segment and which extends at its other end to the stern of said discharging track, said other end of said tubular structure having a horizontal coupling shaft which extends from the sides and lower part thereof into the slits between said forks and which is prevented from coming out of said slits by said clamping pins, while the upper part of said other tubular bridge end extends into the recess and is guided and follows said vertical curvilinear wall.

3. An apparatus according to claim 1, wherein the wall defining the rearward end of said slits between said horizontal forks and the curvilinear walls defining said recess act as a stop means for horizontal rotation of said coupling shaft.

4. An apparatus according to claim 1, wherein said mechanism for coupling and lifting pipes to be welded to the pipeline comprises, two parallel conveyer belts on the vessel which are at right angles relative to the longitudinal axis of said discharing track, and four independently and remotely controlled elevators on said vessel lined up along the longitudinal axis of the said pipeline discharging track, two of said elevators being provided each with a pair of sliding rollers having axes arranged in parallel to said longitudinal axis which rotate pipe to be welded around about its axis, said rotation being imparted to the pipe by a remotely operated driving roller oriented in the same direction as said rollers and which is carried by a vertically movable and remotely controlled frame member on the vessel between said conveyer belts, the other two elevators being provided each with a pair of sliding rollers arranged substantially in the form of a V in the orthogonal direction relative to said longitudinal axis for approaching the pipe to be welded to the pipeline, said advancing motion of the pipe being given by another remotely controlled driving roller supported with its axis oriented orthogonally relative to said longitudinal axis by a vertically movable and remotely controlled frame member on the vessel between said conveyer belts, the two different types of elevators being carried in alternate pairs of two remotely controlled trolleys movable orthogonally relative to the said longitudinal axis on rails on the vessel.

5. An apparatus according to claim 1 in which said tensioning mechanism includes two opposed caterpillars which adapt themselves to the curvature of the pipeline portion lying on said discharging track for applying a tension force to said pipeline.

* * * * *

UNITED STATES PATENT AND TRADEMARK OFFICE
CERTIFICATE OF CORRECTION

PATENT NO. : 3,901,043
DATED : August 26, 1975
INVENTOR(S) : Antonio Silvestri and Guglielmo Gargatagli It is certified that error appears in the above-identified patent and that said Letters Patent are hereby corrected as shown below:

Col. 1, line 63, after "hand," insert -- is --.

Col. 2, line 24, delete "of", line 32, after "course" change the colon ":" to a period -- . --, line 36, after "variable" delete the comma "," and insert -- parameters, --.

Col. 3, line 4, after "because" insert -- the --.

Col. 5, line 65, delete "said", line 66, correct the spelling of "located".

Signed and Sealed this eighteenth Day of May 1976

[SEAL]

Attest:

RUTH C. MASON
Attesting Officer

C. MARSHALL DANN
Commissioner of Patents and Trademarks